A. HODEL & F. A. STAUBER.
Garden-Sprinklers.
No. 199,293. Patented Jan. 15, 1878.
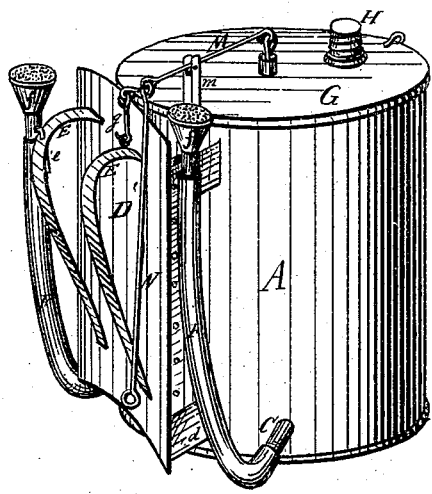
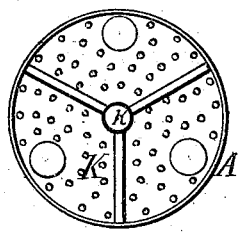
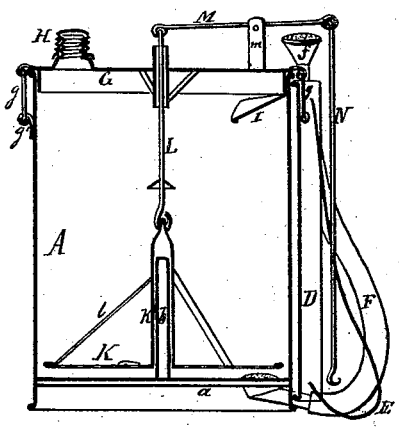
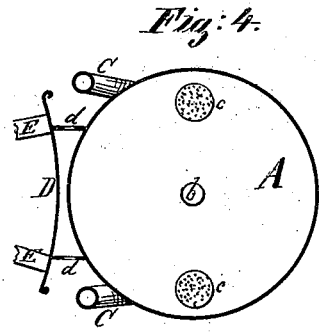
Witnesses: Inventor
Adolf Hodel
Frank A. Stauber
By Geo. W. Dyer & Co.
Attorneys

UNITED STATES PATENT OFFICE.

ADOLF HODEL, OF JEFFERSON, AND FRANK A. STAUBER, OF CHICAGO, ILLINOIS.

IMPROVEMENT IN GARDEN-SPRINKLERS.

Specification forming part of Letters Patent No. 199,293, dated January 15, 1878; application filed June 6, 1877.

*To all whom it may concern:*

Be it known that we, ADOLF HODEL, of Jefferson, and FRANK A. STAUBER, of Chicago, in the county of Cook and State of Illinois, have invented a new and Improved Garden-Sprinkler, as fully set forth and described in the following specification, reference being had to the accompanying drawing, in which—

Figure 1 is an exterior perspective view; Fig. 2, a vertical section through center; Fig. 3, a sectional plan of the perforated agitating-plunger, and Fig. 4 a horizontal section of the vessel.

The nature of our invention relates to garden-sprinklers which the farmer will carry on his back, and which may contain a solution of an insect-destroying poison; and it consists of a cylindrical vessel with a removable cover, and of a perforated plunger within, actuated from a hand-lever, so as to agitate the contents in said vessel from time to time while sprinkling, thereby insuring a thorough mixture of the poison with the water; of a ventilated space between the vessel and the shoulder-plate; and of the general construction, arrangement, and operation of the apparatus, as hereinafter described.

A is a cylindrical vessel, having a permanent bottom, $a$, stiffened by a brace-bar underneath, for giving additional support to its central portion. Upon the center of said bottom $a$ is secured an upright stem, $b$. C C are two outlet-pipes, their openings in the bottom $a$ being protected each by a concave strainer, $c$. D is the curved shoulder-plate, which is firmly connected to the vessel A by two brace-bars, $d$, at each side, so as to leave an open space between said vessel and plate, concealed by two vertical strips of tin, perforated and soldered to the vessel A, so as to permit a free circulation of air between, the object of which is to hinder the farmer's shoulders being brought in close contact with the vessel when filled with cold well-water, whereby he would be apt to catch cold. Shoulder-straps E are attached to the plate D. The end of a hose, F, is coupled to each pipe C, their opposite ends having sprinkler-nozzles $f$, each of which is provided with a pointed hook, $e$, by means of which the nozzle $f$ may be suspended either to one of the top brace-bars $d$ or to shoulder-straps E at such an elevation that no liquid can escape, thereby making an extra shutting-off device unnecessary. G is the lid or cover, having a rim projecting into the vessel A, so as to make a tight joint therewith, and being locked thereto by hooks $g$, hinged to lid G, and staples $g'$, secured one to vessel A and one to plate D. A screw-stopper, H, is provided in said cover, through which the vessel is to be filled, while the cover is only removed if the vessel is to be cleaned. An inclined shelf, I, secured to the inner wall of the vessel A at the side nearest to the plate D, is to prevent the liquid squirting through the cover-joint and wetting the bearer. A perforated plunger, K, has a hollow stem, K', which telescopes with the upright stem $b$, so as to form a guide, and is stiffened by brace-bars $l$. Said plunger K is weighted by lumps of lead soldered upon its surface. The upper end of the hollow stem K' is eye-shaped, and is coupled to the lower end of a rod, L, passed through a tube, which is projected through the center of the cover G. The top end of said rod is connected to one end of a beam, M, pivoted at its center into a bifurcated standard, $m$, which is secured upon the cover G, while its opposite end has attached the top end of a bar, N, forming a handle on its bottom end, by which the farmer will actuate the plunger K.

Paris-green or other suitable poisonous substance being added to the water in the vessel, it is of great importance to not only mix the same well, but also to keep it in a thoroughly-mixed condition, and it is the object of the use of the plunger K to facilitate this operation.

The bearer of the sprinkler-vessel, while he goes through the field or garden with one of the sprinkler-nozzles in each hand distributing the liquid upon the plants, will once in a while pull the bar N downward, thereby lifting the plunger K, which will sink again by its own weight, whereby the liquid will be agitated, and kept in a well-mixed condition.

What we claim as our invention, and desire to secure by Letters Patent, is—

1. A garden-sprinkler consisting of a cylindrical vessel, A, having shoulder-plate D, secured thereto at such distance apart as to leave an air-space between, substantially as and for the purpose described.

2. In a garden-sprinkler, the combination, with the vessel A, adapted to be carried on the back of the operator, of the perforated plunger K, rod L, beam M, pivoted in a standard rising from the cover G, and rod N, hanging down from the end of the beam M, so that the plunger can be conveniently moved while the apparatus is in position, constructed and arranged substantially as described and shown.

3. In a garden-sprinkler, the combination, with the vessel A, of the stem $b$ in the bottom of such vessel, and the perforated plunger K, having a hollow stem, K', sliding over the said stem $b$, constructed and arranged substantially as described and shown.

4. In a garden-sprinkler adapted to be carried on the back of the operator, the combination, with the vessel A and cover G, of the inclined deflector I, secured to the inside of the vessel next to the shield for the operator, constructed substantially as and for the purposes set forth.

ADOLF HODEL.
FRANK A. STAUBER.

Witnesses:
WM. H. LOTZ,
EMIL H. FROMMANN.